United States Patent
Kim et al.

(10) Patent No.: US 8,718,624 B2
(45) Date of Patent: May 6, 2014

(54) ELECTRONIC DEVICE AND METHOD FOR TRANSMITTING DATA

(75) Inventors: Hyunmin Kim, Seoul (KR); Jisuk Chae, Yongin-si (KR); Kyunghee Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/272,557

(22) Filed: Oct. 13, 2011

(65) Prior Publication Data

US 2012/0094626 A1 Apr. 19, 2012

(30) Foreign Application Priority Data

Oct. 14, 2010 (KR) ........................ 10-2010-0100497

(51) Int. Cl.
*H04M 3/42* (2006.01)
(52) U.S. Cl.
USPC ..... 455/415; 455/456.2; 455/566; 455/414.1; 455/567; 455/556.2; 345/156; 345/157; 345/173; 345/174; 348/553; 348/563; 348/569
(58) Field of Classification Search
USPC ............ 455/415, 456.2, 456.3, 456.6, 556.2, 455/566, 567, 414.1, 414.2, 414.3; 345/156, 157, 173, 174; 348/553, 563, 348/569
See application file for complete search history.

(56) References Cited

U.S. PATENT DOCUMENTS

| | | | |
|---|---|---|---|
| 8,081,992 B2 * | 12/2011 | Book | 455/457 |
| 2006/0240821 A1 * | 10/2006 | Chien | 455/433 |
| 2009/0197621 A1 * | 8/2009 | Book | 455/457 |
| 2009/0318168 A1 * | 12/2009 | Khosravy et al. | 455/456.3 |
| 2010/0029302 A1 * | 2/2010 | Lee et al. | 455/456.6 |
| 2010/0058193 A1 * | 3/2010 | Sherrard et al. | 715/738 |
| 2011/0098061 A1 * | 4/2011 | Yoon | 455/456.3 |
| 2011/0105095 A1 * | 5/2011 | Kedefors et al. | 455/418 |
| 2011/0111798 A1 * | 5/2011 | Jeon et al. | 455/556.1 |
| 2012/0062602 A1 * | 3/2012 | Vadhavana et al. | 345/676 |
| 2012/0253665 A1 * | 10/2012 | Forstall et al. | 701/450 |

FOREIGN PATENT DOCUMENTS

| | | |
|---|---|---|
| CN | 2768330 Y | 3/2006 |
| CN | 201541349 U | 8/2010 |

OTHER PUBLICATIONS

Chinese Office Action dated Jan. 22, 2014 for Application 201110310036.6 and English language translation.

* cited by examiner

*Primary Examiner* — Khai M Nguyen
(74) *Attorney, Agent, or Firm* — KED & Associates LLP

(57) ABSTRACT

An electronic device and a method for transmitting data are disclosed. A network interface receives identification information to identify a communicating end from a mobile communication terminal. A controller acquires communicating end information based on the received identification information. A display displays the acquired communicating end information and at least one service area.

20 Claims, 16 Drawing Sheets

1103

1104

ELECTRONIC DEVICE AND METHOD FOR TRANSMITTING DATA

CROSS-REFERENCE TO RELATED APPLICATION(S)

This application claims priority under 35 U.S.C. §119 to Korean Application No. 10-2010-0100497 filed on Oct. 14, 2010, whose entire disclosure is are hereby incorporated by reference.

BACKGROUND

1. Field

The present invention relates to an electronic device and a method for transmitting data, more particularly, to an electronic device capable of transmitting data required to transmit and a method for transmitting the data using the electronic device.

2. Background

Electronic devices including broadcasting receivers, personal computers, notebooks, mobile phones and the like may be configured to perform a variety of functions. Such a variety of functions may be a broadcasting receiving function, data/audio communication function, a motion picture taking function by using cameras, an audio storing function, a music file playing function via a speaker system, an image or video displaying function and the like. Some terminals may further have an additional game implementing function.

In addition, such an electronic device has been under development to be slim for portable convenience and to have an input device such as a touch pad and a touch screen for operational convenience. A conventional electronic device performs corresponding operations, once the touch pad and the touch screen are touched. Those operations are corresponding to a user's selection on a display screen. Also, those operations may include paging, scrolling, panning, zooming and the like.

According to the touch pad, when a user's finger is moving along a surface of the touch pad, motion of an input pointer is corresponding to relative motion of the user's finger. In contrast, a touch screen is a kind of a display screen having a touch sensing transparent panel covering a screen. When using the touch screen, the user may select directly points GUI object on the display screen by a stylus or a finger, to select a corresponding GUI.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the specific embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Figure 1:
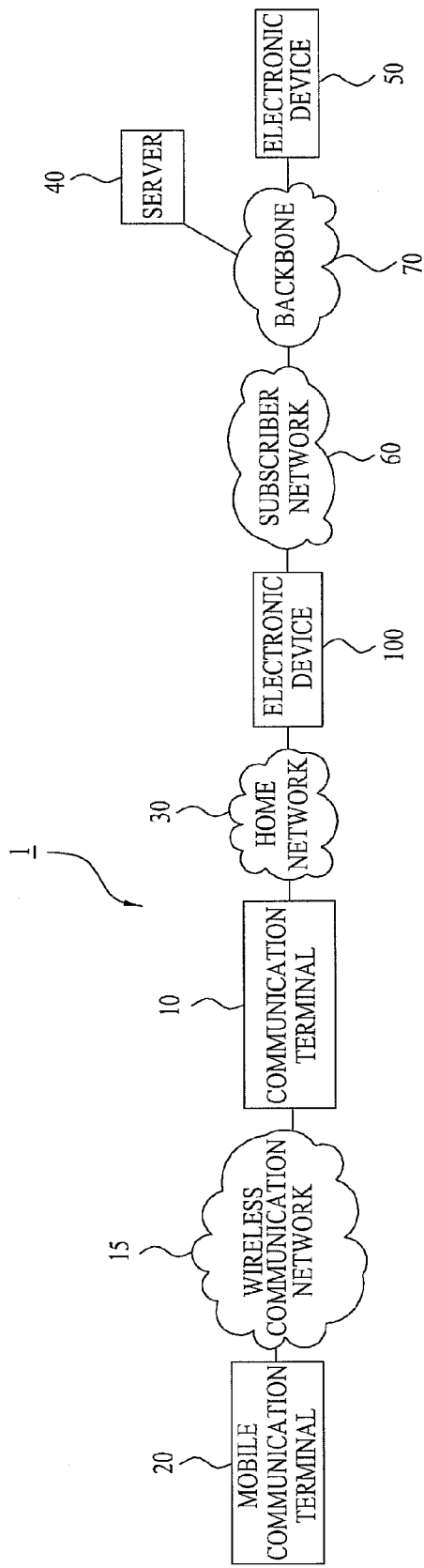
FIG. 1 is a diagram illustrating a configuration of a data transmitting system according to an exemplary embodiment of the present invention.

FIG. 1 is a diagram illustrating a configuration of a data transmission system according to an exemplary embodiment of the present invention.

In reference to FIG. 1, a data transmission system 1 according to the exemplary embodiment of the present invention includes mobile communication terminals 10 and 20, electronic devices 50 and 100, and a server 40.

Each of the mobile communication terminals 10 and 20 may be a mobile phone, smart phone, laptop computer, notebook, digital broadcasting terminal, PDA (Personal Digital Assistants), PMP (Portable Multimedia Player), navigation or the like.

The mobile communication terminals 10 and 20 may transmit and receive a wireless signal to and from at least one of a base station, an external terminal or a server via a wireless communication network 15. The wireless signal may include various types of data according to transmitting/receiving of an audio call signal, image phone call signal or texture/multimedia message.

The mobile communication terminal 10 may transmit communicating end identification information to the electronic device 100 via a home network 30 to identify a counterpart talker on the other line of a call. Here, the communicating end identification information may be identification information to identify a mobile communication terminal requesting call-connection with the mobile communication terminal 10 or it may be identification information to identify a mobile communication terminal call-connected with the mobile communication terminal 10. Alternatively, the communicating end identification information may be identification information to identify a mobile communication terminal with which the mobile communication terminal 10 requests call-connection. The communicating end identification information may be a telephone number or an identifier related to a telephone number. Here, the identifier related to the telephone number may be information stored in a mobile communication terminal, related to the telephone number. For example, when a name is stored in the mobile communication terminal in relation to a telephone number, the name may be an identifier related to the telephone number.

The communicating end identification information may be transmitted at a predetermined point of receiving call-connection request, call-connection requesting, call setting and the user's requesting.

The communicating end identification information may be transmitted via one of communication systems including Zigbee, Bluetooth, UWB and Wireless Lan. In other words, the home network 30 may be configured of one of Zigbee, Bluetooth, UWB and Wireless Lan communication systems.

Each of the electronic devices 50 and 100 may be personal computer such as a desktop, laptop, tablet or handheld computer. Also, each of the electronic devices 50 and 100 may be a mobile terminal such as a mobile phone, smart phone, digital broadcasting terminal, PDA (Personal Digital Assistants), PMP (Portable Multimedia Player), navigation and the like or a fixed-type electric appliance such as a digital TV and the like. Alternatively, each of the electronic devices 50 and 100 may be a mail server providing a mail service or a messenger server providing a messenger service.

The electronic device 100 may receive communicating end identification information from the mobile communication terminal 10 via the home network 30 and it may acquire communicating end information based on the received communicating end identification information. The electronic device 100 may search for the communicating end information directly or it may request the server 40 to search for the communicating end information. Here, the communicating end information may include at least one of a name, relation information, an affiliated organization name, a job position name, a picture, a telephone number, an email address and a messenger address. Also, the communicating end information may be information stored in a local memory of the electronic device 100 or information received via network communication. The relation information is information representing a relation between the user and the communicating end and it may indicate one of a family member, a friend, a senior, a junior, a coworker, a business acquaintance and a club member.

The electronic device 100 may display the acquired transmitter information and a service area. When it is requested to transmit information or contents displayed in the service area, the electronic device 100 may transmit the transmission-requested information or contents to the electronic device 50 via at least one of a subscriber network 60 or a backbone network 70. Here, the backbone network 70 may be one or combination of at least two of X.25 network, Frame Relay network, ATM network, Multi Protocol Label Switching (MPLS) network and Generalized Multi Protocol Label Switching network. The subscriber network 60 may be one of Fiber to The Home (FTTH), Asymmetric Digital Subscriber Line (ADSL), Cable network, Wireless LAN (IEEE 802.11B, IEEE 802.11A, IEEE 802.11G and IEEE 802.11N), Wireless Broadband (WIBro), Wimax and High Speed Downlink Packet Access (HSDPA). The electronic device 100 may be connected with the subscriber network 60.

The server 40 may receive a search requesting signal to request search for communicating end information from the electronic device 100 via at least one network of the subscriber network 60 and backbone network 70. When receiving the search requesting signal, the server 40 may search for the communicating end information and it may transmit the result of the search to the electronic device 100. Here, the search requesting signal may include communicating end identification information and the server 40 may search for communicating end information based on the communicating end identification information.

Figure 2:
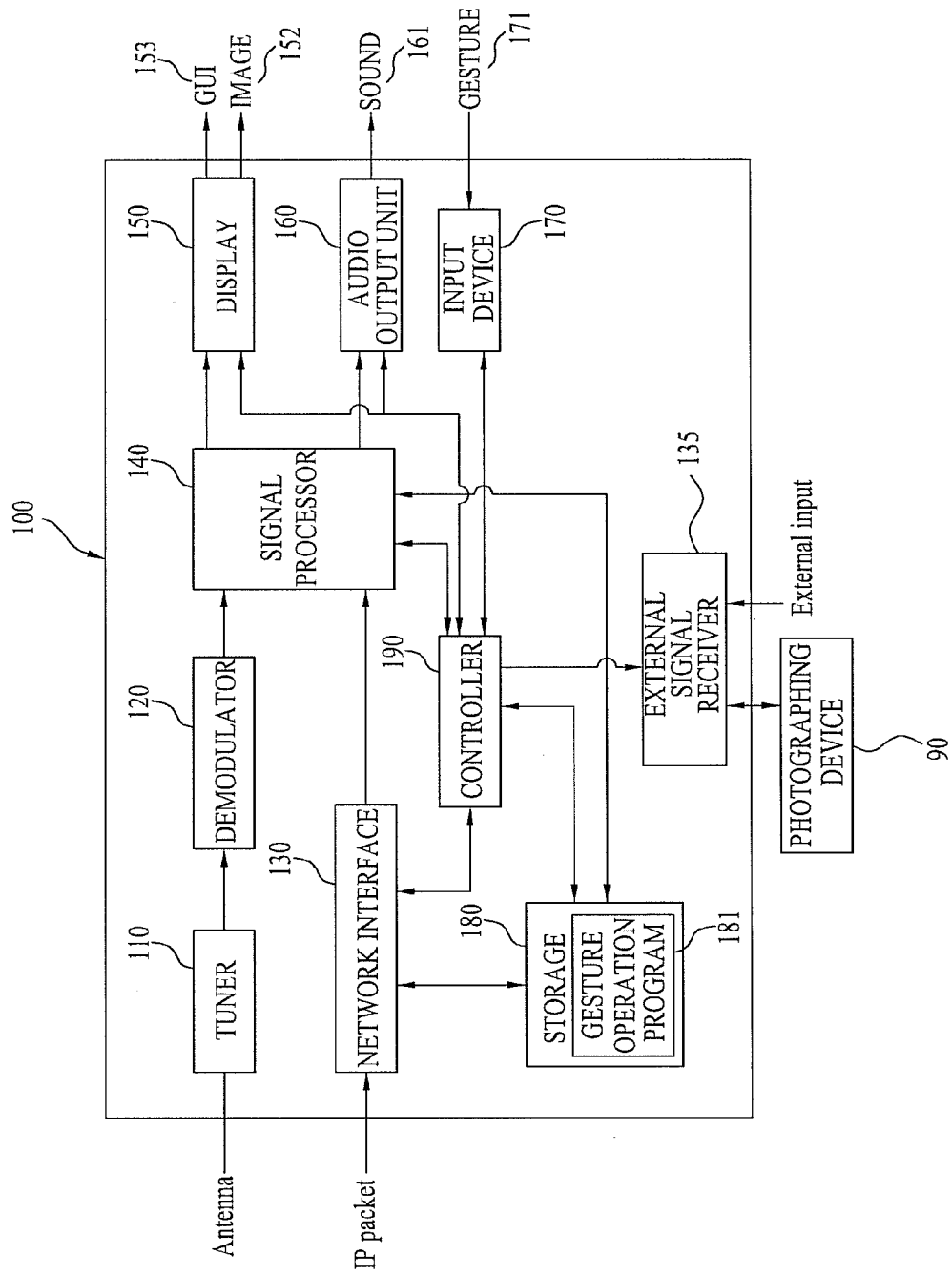
FIG. 2 is a block view illustrating a configuration of an electronic device according to an exemplary embodiment of the present invention.

FIG. 2 is a block view illustrating a configuration of an electronic device according to an exemplary embodiment of the present invention.

In reference to FIG. 2, an electronic device 100 includes a tuner 110, a demodulator 120, a network interface 130, a signal processor 140, a display 150, an audio output unit 160, an input device 170, a storage 180, a controller 190 and an external signal receiver 135. The electronic device 100 may be a personal computer system such as a desktop, laptop, tablet and handheld computer. The electronic device 100 may be a mobile terminal such as a mobile phone, smart phone, digital broadcasting terminal, PDA (Personal Digital Assistants), PMP (Portable Multimedia Player), navigation and the like or a fixed-type electric appliance such as a digital TV and the like.

The tuner 110 selects one of RF (Radio Frequency) broadcasting signals received via an antenna, corresponding to a channel selected by a user, and it converts the selected RF broadcasting signal into a middle frequency signal or a baseband video or audio signal. For example, when the selected RF broadcasting signal is a digital broadcasting signal, the tune 110 converts the selected RF broadcasting signal into a digital IF signal (DIF). When it is an analog broadcasting signal, the tuner 110 converts the selected RF broadcasting signal into an analog baseband video or video signal (CVBS SIF). That is, the tuner 110 may process the digital broadcasting signal or analog broadcasting signal. The analog baseband video or audio signal (CVBS SIF) outputted from the tuner 110 may be inputted to the signal processor 140 directly.

In addition, the tuner 110 may be receive a RF broadcasting with a single carrier according to ATSC (Advanced Television System Committee) or a RF broadcasting signal with a plurality of carriers according to DVB (Digital Video Broadcasting).

An electronic device 100 according to another embodiment of the present invention may include at least two tuners. When the at least two tuners are provided, a second tuner selects one of RF broadcasting signals received via the antenna, which is corresponding to a channel selected by the user, like a first tuner, and the second tuner converts the selected RF broadcasting signal into a middle frequency signal or baseband video or audio signal.

In addition, the second tuner sequentially selects RF broadcasting signals of the received RF signals, which are corresponding to all of the stored broadcasting channels via a channel memory function, and it converts them into the middle frequency signals or baseband video/audio signals. The second tuner may perform conversion of all of the broadcasting channels periodically. Because of that, the electronic device 100 may provide images of broadcasting signals converted by the first tuner and it may provide a thumbnail type of images converted by the second tuner simultaneously. In this case, the first tuner converts a main RF broadcasting signal selected by the user into a middle frequency signal or baseband video/audio signal, and the second tuner sequentially and periodically selects the other RF broadcasting signals except the main RF broadcasting signal and it converts them into middle frequency signals or baseband video/audio signals.

The demodulator 120 receives a digital IF signal (DIF) converted by the tuner 110 and it performs demodulation of DIF. For example, when the digital IF signal outputted from the tuner 110 is an ATSC system, the demodulator 120 performs 8-VBS (8-Vestigial Side Band) demodulation. Alternatively, when the digital IF signal outputted from the tuner 110 is a DVB system, the demodulator 120 performs demodulation of COFDMA (Coded Orthogonal Frequency Division Modulation).

The demodulator 120 may perform channel decoding. For that, the demodulator 120 may include a trellis decoder, a de-interleaver and a reed Solomon decoder to perform trellis decoding, de-interleaving and reed Solomon decoding.

After performing the demodulation and channel decoding, the demodulator 120 may output a stream signal (TS). At this time, the stream signal may be a signal multiplexed of video, audio and data signals. For example, the stream signal may be MPEG-2 Ts (Transport Stream) multiplexed of MPEG-2 format video signal, dolby AC-3 format audio signal. Specifically, MPEG-2 Ts may include 4 byte header and 184 bite payload.

The stream signal outputted from the demodulator 120 may be inputted to the signal processor 140. After performing demultiplexing and signal processing, the signal processor 140 outputs an image to the transparent display 150 and it outputs a sound to the audio output unit 160.

In case of the digital broadcasting receiver having at least two tuners, the corresponding number of demodulators to the at least two tuners may be provided. The demodulators may be provided independently based on ATSC and DVB system.

The network interface 130 receives packets from the network and transmits packets to the network. The network interface 130 may transmit IP packets including a search requesting signal to the server 40 via the network and it may receive IP packets including the result of search from the server 40. In addition, the network interface 130 may receive communicating end identification information from the mobile communication terminal 10 via the home network 30. Also, the network interface 130 may transmit IP packets including information or contents to the electronic device 50.

The network interface 130 receives IP packets configured to transport broadcasting data from the service providing server via the network. Here, the broadcasting data includes contents, an update message configured to notify contents updating, metadata, service information, software codes and A/V data. The service information may include service information on a real-time broadcasting service and service information on an internet service. Here, the internet service means a service provided via the internet, for example, a Cod (Content's on Demand) service, YouTube service, an information service for weather, news, community information and search, an entertainment service for a game and karaoke, and a communication service for TV mail and TV SMS (Short Message Service). As a result, the digital broadcasting receiver according to the present invention may include a network TV, web TV and broadband TV. Also, the broadcasting service may include an internet service as well as a broadcasting service provided via terrestrial, satellite and cable.

The controller 190 implements commands and it performs an operation related to the electronic device 100. For example, the controller 190 may control input and output and receiving and processing of data between components of the electronic device 100, using a command searched in the storage 180. The controller 190 may be represented on a single chip, a plurality of chips or a plurality of electric parts. For example, a variety of architectures including an exclusive or embedded processor, a single purpose processor, controller, ASIC and the like may be useable with respect to the controller 190.

The controller 190 implements a computer code together with an operating system and it performs generation and usage of data. The operating system is well-known in the art to which the present invention pertains and description of the operating system will be omitted. For example, the operating system may be Window series OS, Unix, Linux, Palm OS, DOS, Android and Macintosh and the like. The operating system, another computer code and data may exist in the storage connected with the controller 190.

Typically, the storage 180 provides storage for program codes and data used by the electronic device 100. For example, the storage 180 may be represented to be a ROM (Read only Memory), RAM (Random Access Memory), hard-disc drive. The program codes and data may exist in a separable storage medium or they may be loaded or installed on the electronic device 100. Here, the separable storage medium includes a CD-ROM, PC-CARD, memory card, floppy disc, magnetic tape and network component.

The display 150 may put into operation, connected with the controller 190. The display 150 may be represented to be an organic light emitting panel or plasma panel.

The display 150 may display a graphic user interface (GUI) 153 configured to provide an easy interface usable between the user of the electronic device and the operating system or a predetermined application implemented on the operating system. The GUI 153 represents a program, a file and operation options as graphic image. The graphic image may include a window, field, a dialog box, menu, icon, button, curser and scrollbar. Such images may be aligned in a layout defined in advance or they may be generated dynamically to help the user's specific handling. During the operation, the user may select and enable the image to start functions and works related to the variety of graphic images. For example, the user may select a button to implement opening, closing, minimizing and maximizing of a window or an icon to start a specific program.

The input device 170 may be a touch screen disposed on or in front of the display 150. The touch screen may be integral with the display 150 or an independent element. The touch screen may be named as a touch screen display. When the touch screen is disposed in front of the display 150, the user may operate the GUI 153 directly. For example, the user may place only his or her finger on an object which will be controlled and there is no one-to-one relation on a touch pad.

The touch pad is placed on another plane, separated from the display 150. For example, the display 150 is typically located on a vertical plane and the touch pad is located in a horizontal plane. This allows usage of the touch pad less intuitive and it is quite difficult, compared with the touch screen. In addition to the touch screen, the input device 170 may be a multipoint input device.

The controller 190 may recognize a gesture 171 applied to the input device 170 and it may control the electronic device 100 based on this gesture 171. Here, the gesture may be defined as predetermined interaction with the input device 170, which is mapped onto at least one specific computing operation. The gesture 171 may be generated by a variety of human fingers, specifically, motion of human fingers. Alternatively, the gesture may be generated by a stylus in addition to the motion of human fingers.

The input device 170 receives the gesture 171 and the controller 190 implements commands configured to perform operations related to the gesture 171. Moreover, the storage 180 may include a gesture operation program 181 which may be a part of the operating system or auxiliary application. The gesture operation program 181 includes a series of commands to recognize generation of the gesture 171 and/or to instruct which step has to be taken in response to the gesture 171 to at least one software agent.

When the user generates one or more gestures, the input device 170 transports gesture information to the controller 190. Using a command transported from the storage 180, specifically, the gesture operation program 181, the controller 190 translates the gesture and it controls each component of the electronic device such as the storage 180, the display 150, the audio output unit 160, the signal processor 140, the network interface 130 and the input device. The gesture 171 may be detected as command for performing operation of an application stored in the storage 180, for modifying the GUI object displayed on the display 150, for modifying data stored in the storage 180 and for performing operation of the network interface 130 and the signal processor. For example, such commands may be related to zooming, panning, scrolling, page turning, rotating, size adjusting, image channel changing, content receiving and internet access. In addition, the commands may be related to starting of a specific program, opening of a file or document, menu viewing, selecting, command implementing, log-on an internet site system, allowing of an identified person to have access to a limited area of a computer system, loading of user profile related to user preference arrangement on a wall paper and/or the like.

A variety of difference gestures may be usable. For example, the gesture may be a single point or multipoint gesture, a static or dynamic gesture, a continuous or segmented gesture, and/or the like. The single point gesture is a gesture performed according to a single touch point. For example, this gesture is performed according to single touch such as a single human finger, palm or stylus. The multipoint gesture is a gesture performed according to multiple points. For example, this gesture is performed according to plural touches such as plural human fingers, human fingers and palm, human fingers and stylus, plural styli and/or combination of them. The static gesture is a gesture having no motion and the dynamic gesture is a gesture having motion. The continuous gesture is a gesture performed according to a single stroke and the segmented gesture is a gesture performed according to an independent sequence of steps or strokes.

The object and the touch on the touch screen have a variety of different patterns, typically. For example, a single point gesture on the touch screen includes a down event and a following up event performed at an identical location or almost identical location of the down event. The dynamic gesture on the touch screen includes a down event and at least one dragging event following the down event and an up event following the at least one dragging event.

According to some embodiments, a parameter is used to describe a process in which a human finger approaches to the touch screen display to touch the touch screen display and to recede from the touch screen display. This parameter may be at least one function of the distance between the human finger and the touch screen display, the pressure of the human finger applied to the touch screen display, the touch area between the human finger and the touch screen, the voltage between the human finger and the touch screen, the capacitance between the human finger and the touch screen display and physical parameters.

According to some embodiments, when the size of the parameter between the human finger and the touch screen display (for example, the capacitance) is higher than a predetermined threshold value level, the down event is performed. While the parameter is the predetermined threshold value level or higher, with a curser position corresponding to the human finger moved from a position 'A' to a position 'B', the dragging is performed. When the parameter is lower than the threshold value level, the up event is performed.

The controller 190 may acquire communicating end information based on the communicating end identification information received by the network interface 130. Here, the controller 190 may search information stored in the storage 180 or information received via the external signal receiver 135 for the communicating end information. Alternatively, the controller 190 may control the search requesting signal to be transmitted to the server 40 and it may receiving the result of search from the server 40, to acquire the communicating end information.

When receiving a transmission request for information or contents displayed in the service area, the controller 190 may control the transmission-requested information or contents to be transported to the electronic device indicated by the acquired communicating end information. Here, the transmission request may be performed by a touch gesture or a space gesture.

The external signal receiver 135 may provide an interface capable of connecting an external device with the electronic device 100. Here, the external device may be one of various kinds of video/audio output devices including a DVD (Digital Versatile Disk), Bluray, game device, camcorder, computer (notebook) and the like. The electronic device 100 may control a video/audio signal received from the external signal receiver 135 to be displayed and it may store or use a data signal.

In addition, the external device may be a photographing device. The photographing device may include a plurality of cameras and it may image a person. The photographing device recognizes a face area of the person and it focuses the face area, to zoom-in, and it images the face area. Here, a human hand shape imaged by the photographing device may be recognized as space gesture. That is, the controller 190 may recognize the imaged hand shape as space gesture and it may implement commands configured to perform operations related to the recognized space gesture. Here, the space gesture may be defined as gesture recognized from an image frame or image received from the photographing device 90, with being mapped onto at least one specific computing operation.

Figure 3:
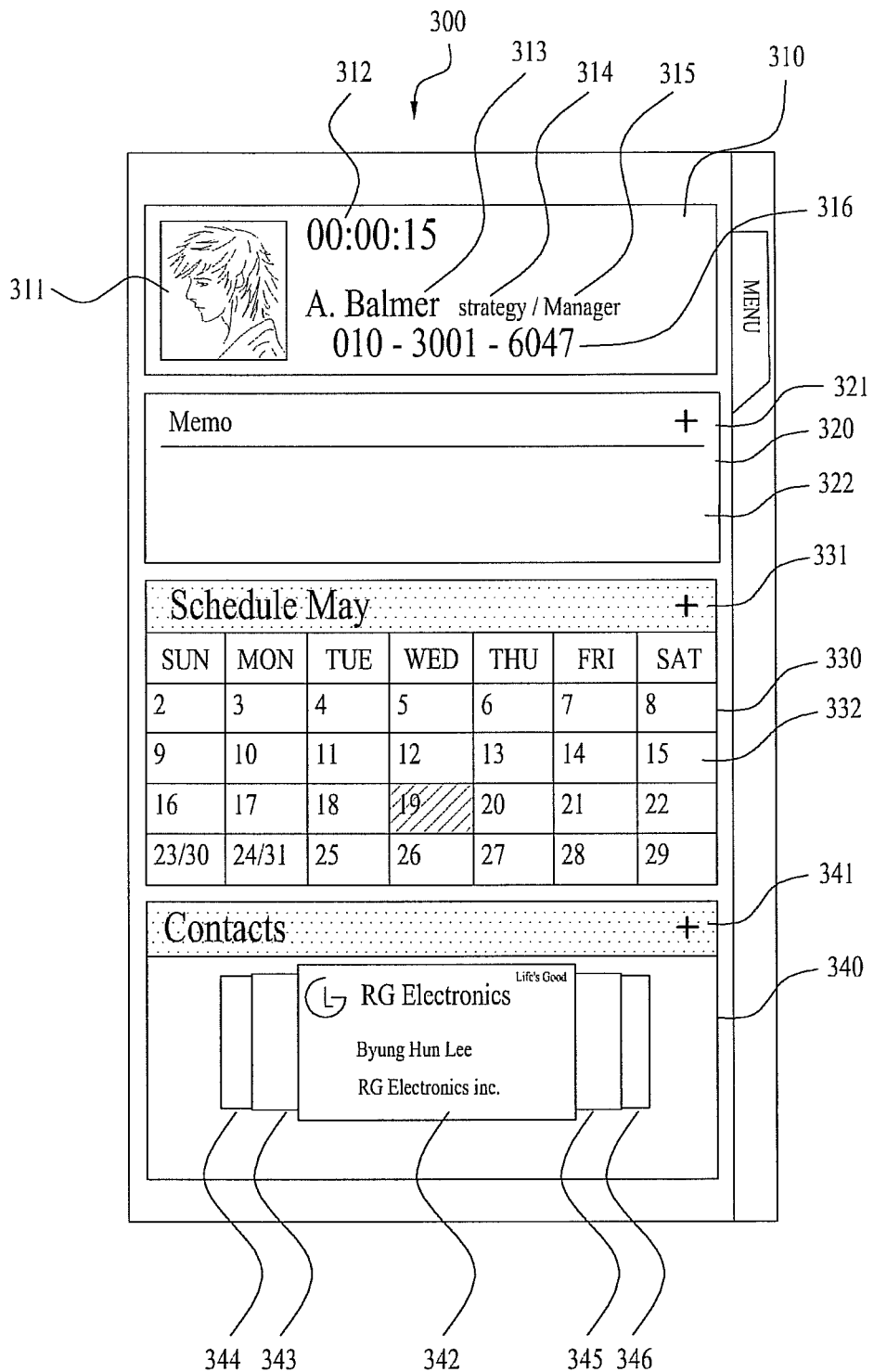
FIG. 3 is a diagram illustrating a screen displaying communicating end information and a service area according to an embodiment.

FIG. 3 is a diagram illustrating a screen displaying communicating end information and a service area.

In reference to FIG. 3, a communicating end information area 310, a memo service area 320, a schedule service area 330 and a business card service area 340 may be displayed on a screen 300.

The communicating end information area 310 displays a picture 311, a talk time 312, a name 313, an affiliated organization name 314, a job position name 315 or a telephone number 316.

Figure 4:
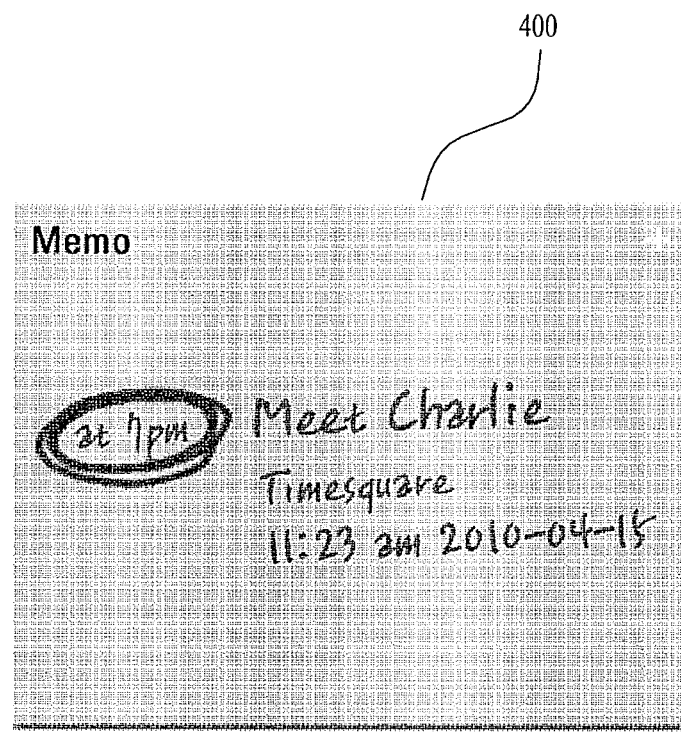
FIG. 4 is a diagram illustrating a screen displaying a memo-window according to an embodiment.

The memo service area 320 may include an input box to receive input information. When a button 321 is pushed within the memo service area 320 or a touch gesture is recognized within the memo service area 320, the controller 190 may control the display 150 to display a memo window 400 shown in FIG. 4. The user may input information in an input method of writing letters on an input box 322 of the memo service area 320 or memo window 400.

When receiving transmission request, the controller 190 controls the information inputted in the input box 322 or memory window 400 to be transmitted. The transmission request may be received by a touch gesture detected on the service area 320.

Figure 5:
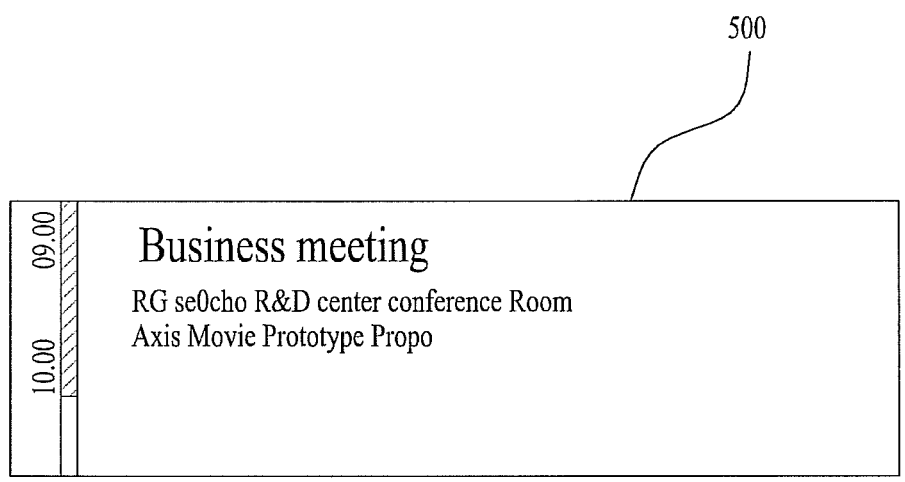
FIG. 5 is a diagram illustrating a screen displaying a schedule window according to an embodiment.

The schedule service area 330 displays a schedule window 332. The schedule window 332 may be displayed in a calendar type. When a button 331 is pushed on the schedule service area 330 or a touch gesture is detected on the schedule service area 330, a schedule window 500 shown in FIG. 5 may be displayed. Here, date '19' is selected in FIG. 3 and then the schedule window 500 displays schedule information of the selected date '19'.

The schedule window 500 may provide an interface capable of identifying schedule information by the hour. The user may select a specific schedule on the schedule window 500 and he or she may request transmission of the selected schedule. Also, the user may input a specific schedule on the schedule window 500 and he or she may request transmission of the input schedule.

The business card service area 340 displays business card images 342, 342, 344, 345 and 346. A business card image 342 of the images 342, 343, 344, 345 and 346 is displayed in a focus-business card image. The focus-business card image refers to a business card image having a focus located thereon out of the business card images displayed on the business card area 340. The focus business card image may be changed according to a detected gesture.

Figure 6:
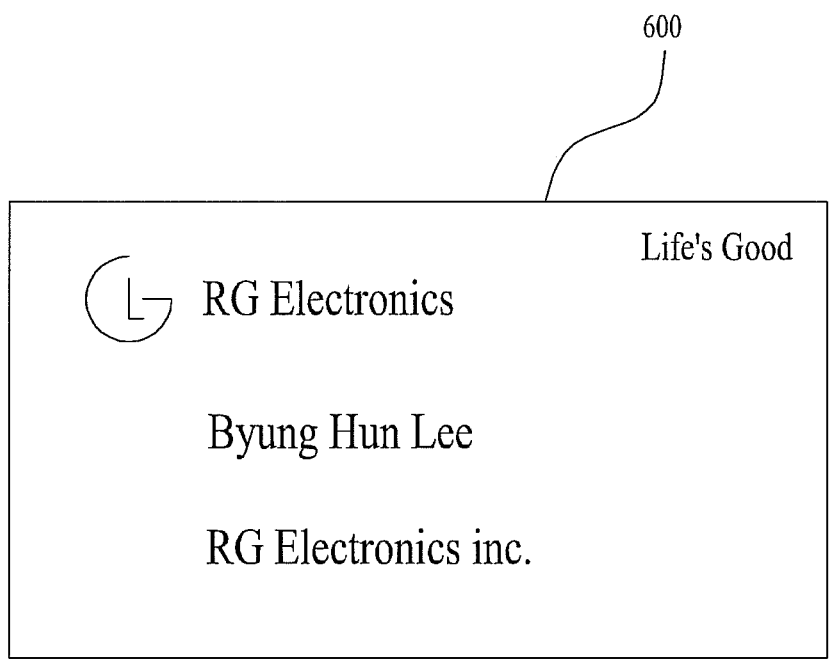
FIG. 6 is a diagram illustrating a screen displaying a business card image according to an embodiment.

When a button 341 is pushed on the business card area 340 or a touch gesture is detected on the business card area 340, a business card image 600 shown in FIG. 6 may be displayed. Here, the focus-business card image shown in FIG. 3 is the business card image 342 and because of that, the business card image 342 is displayed as business card image 600.

When receiving transmission request, the controller 190 may control the focus-business card image to be transmitted.

Figure 7:
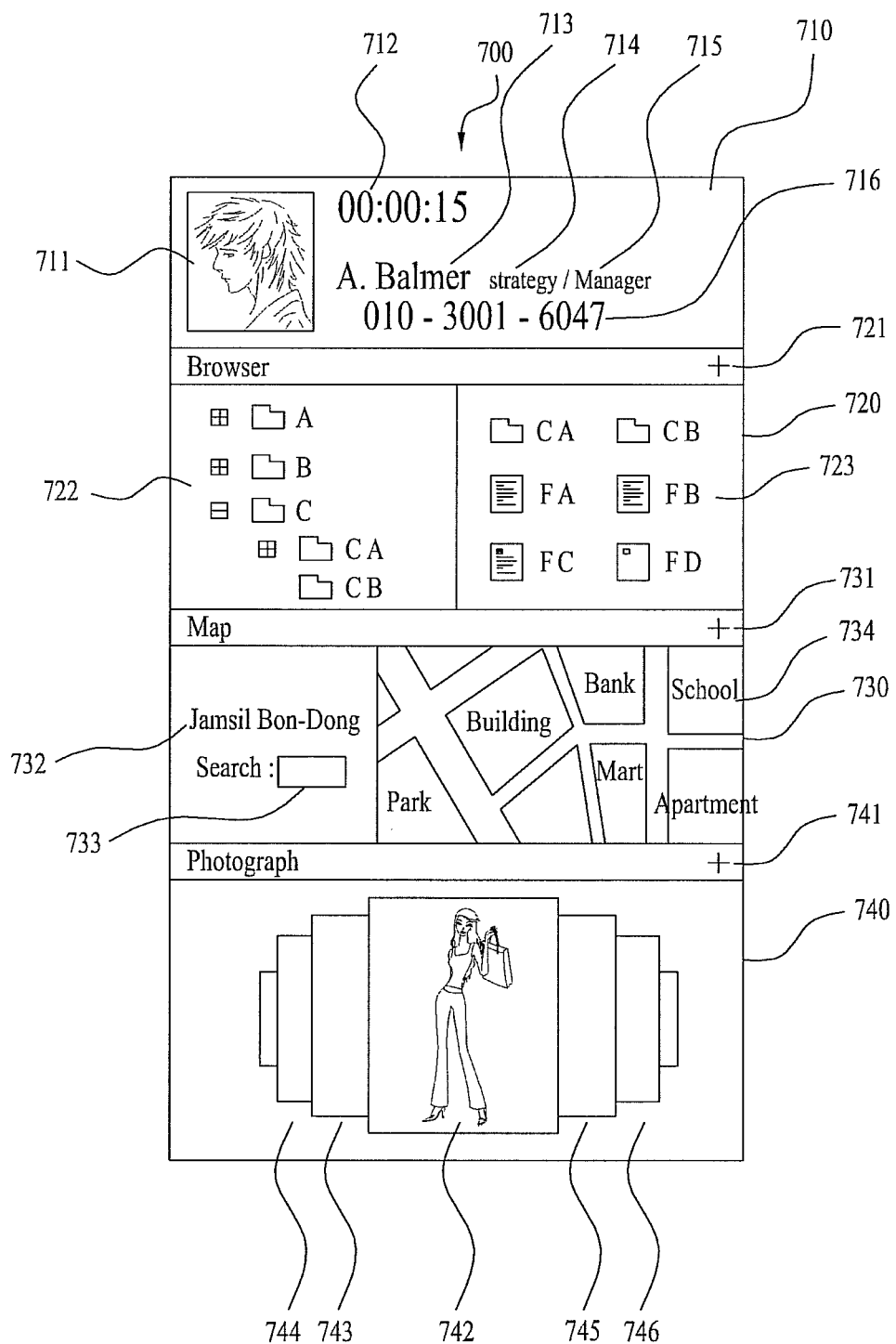
FIG. 7 is a diagram illustrating a screen displaying communicating end information and a service area according to another embodiment.

FIG. 7 is a diagram illustrating a screen displaying communicating end information and a service area according to another embodiment.

In reference to FIG. 7, a screen 700 displays a communicating end information area 710, a file search service area 720, a map service area 730 and a picture service area 740.

The communicating end information area 710 displays a picture 711, a talk time 712, a name 713, an affiliated organization name 714, a job position name 715 and a telephone number 716.

Figure 8:
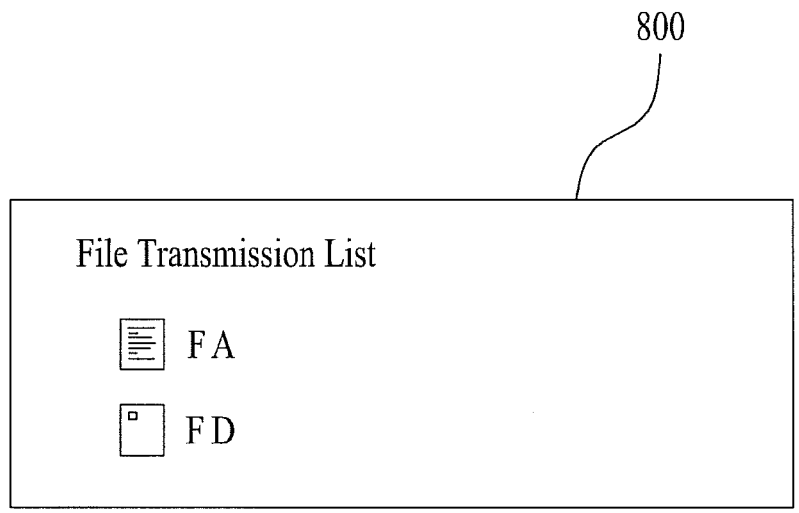
FIG. 8 is a diagram illustrating a screen displaying a file transmission list according to an embodiment.

The file search service area 720 includes an area 722 configured to allow a specific folder to be selected and an area 723 configured to display a list of files included in the selected folder. The user may select a file wished to transmit on the area 723. When a button 721 is pushed or a touch gesture is detected on the file search service area 730, a file transmission list 800 shown in FIG. 8 may be displayed. The file transmission list 800 displays a list of files selected to transmit.

When receiving file transmission request, the controller 190 may control files included in the file transmission list 800 to be transmitted.

The map service area 730 includes a place name 732 of the map displayed currently, an area 733 configured to receive input of a place which will be searched for and an area 734 configured to display a searched map.

Figure 9:
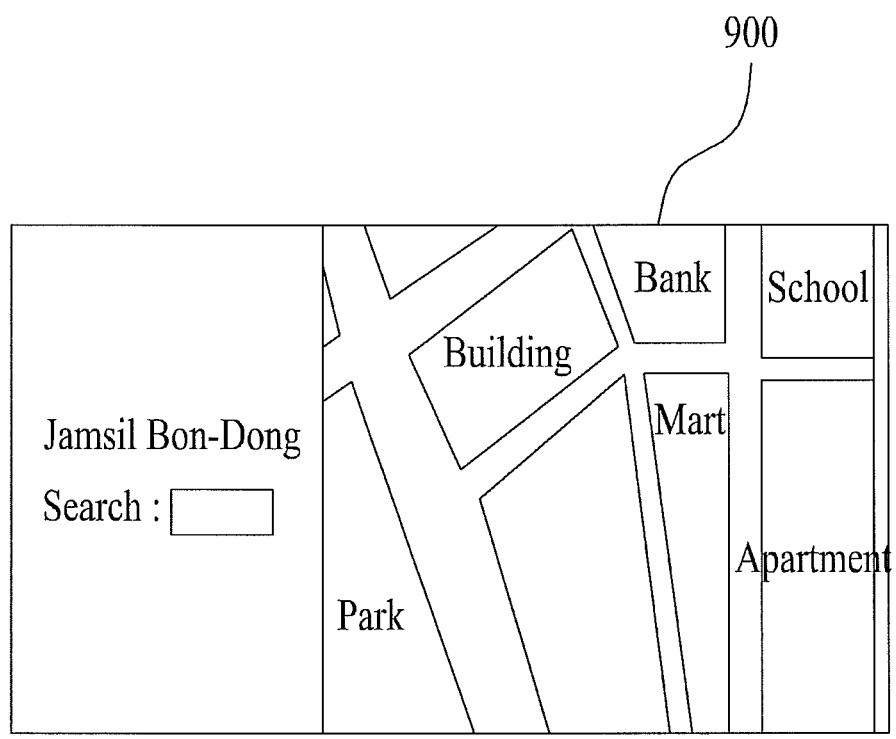
FIG. 9 is a diagram illustrating a screen displaying a map according to an embodiment.

A map of Jamsil Bon-dong 732 shown in FIG. 7 is displayed on the area 734. When a button 731 is pushed, a map window 900 shown in FIG. 9 may be displayed and the map window 900 displays the map of Jamsil Bon-dong.

When receiving transmission request, the controller 190 may control the map of jamsil Bon-dong to be transmitted.

The picture service area 740 displays pictures 742, 743, 744, 745 and 746. A picture 742 of the pictures 742, 743, 744, 745 and 746 is displayed in a focus-picture type. A focus-picture refers to a picture having a focus located thereon out of the pictures displayed on the picture service area 740. The focus picture may be changed according to a detected gesture.

Figure 10:
FIG. 10 is a diagram illustrating a screen displaying a picture according to an embodiment.
Figure 11A:
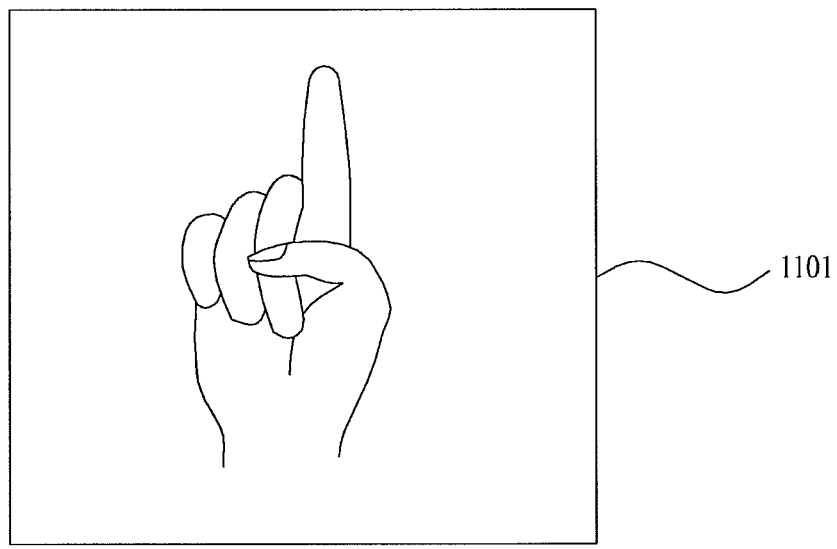
FIGS. 11a to 11g are diagrams illustrating a screen displaying a detected gesture.
Figure 11B:
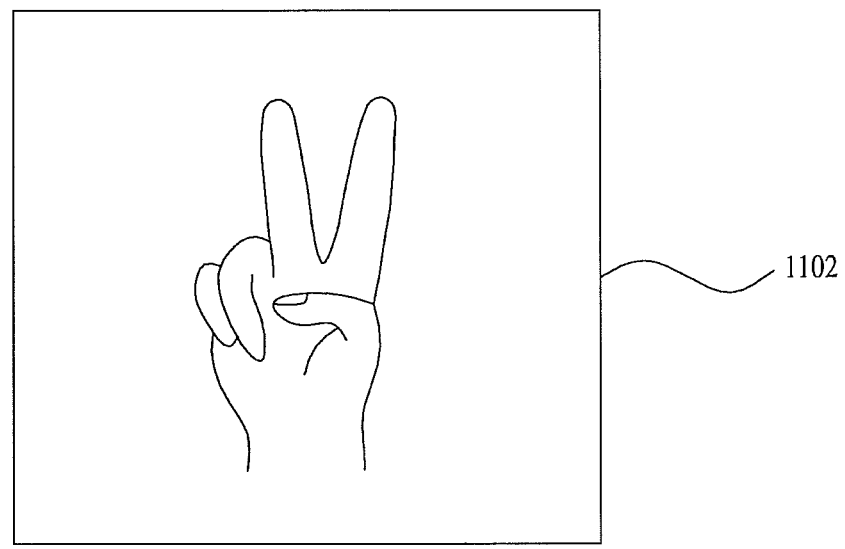
Figure 11C:
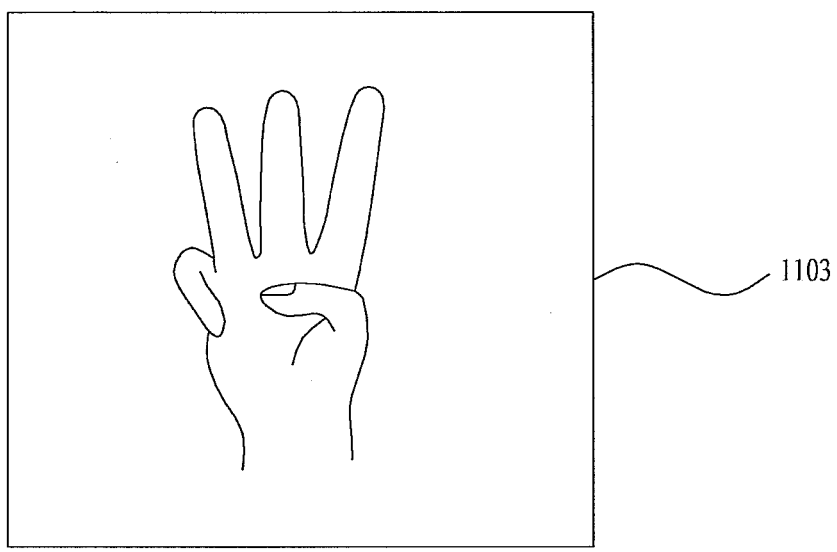
Figure 11D:
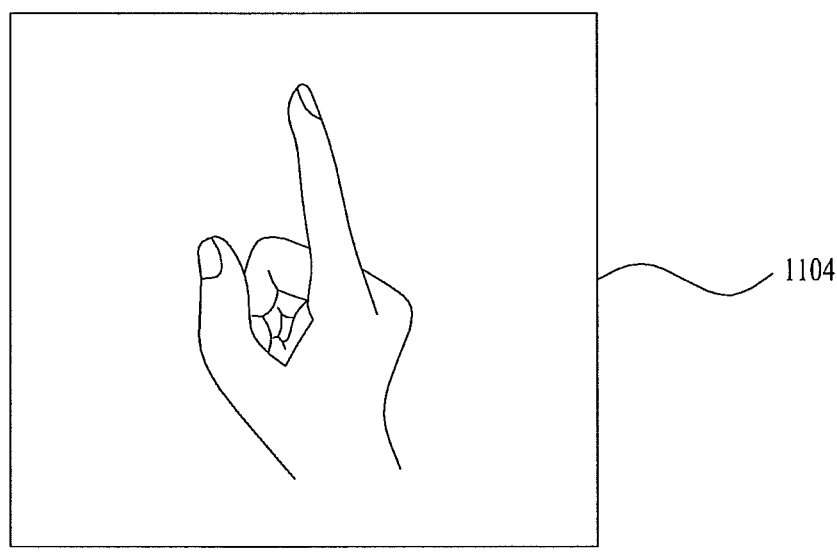
Figure 11E:
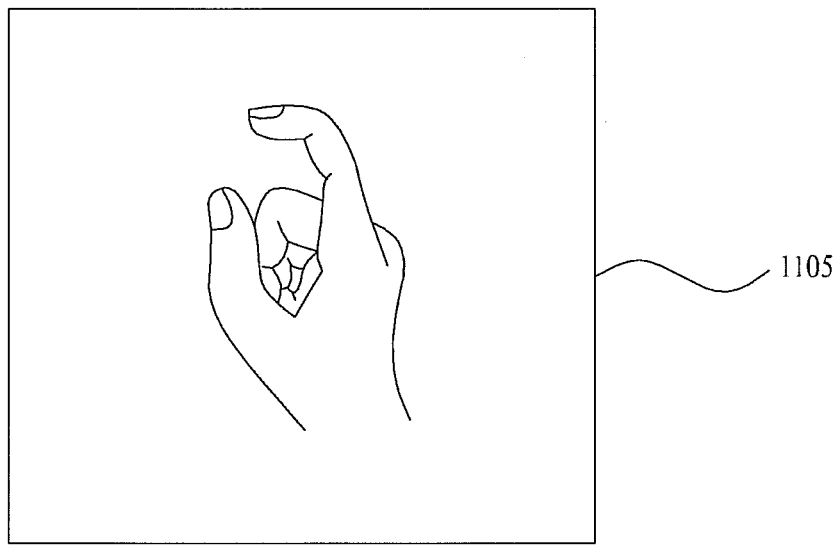
Figure 11F:
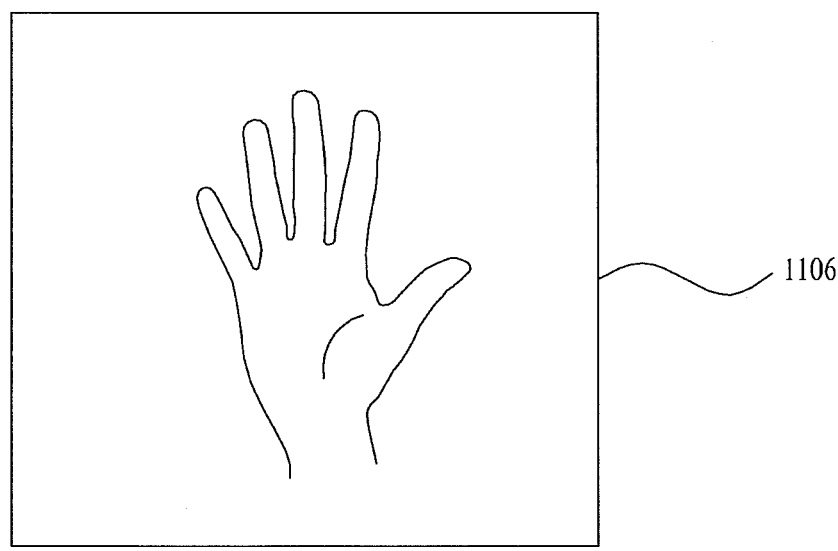
Figure 11G:
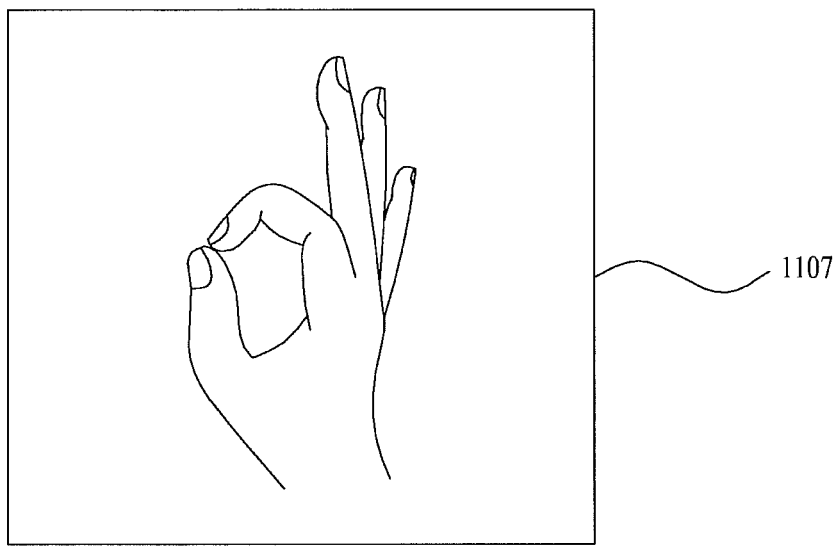

When a button 741 is pushed or a touch gesture is detected on the picture service area 740, a picture 1000 shown in FIG. 10 may be displayed. The focus picture of FIG. 7 is a picture 742 and the picture 742 is displayed as picture 1000.

When receiving transmission request, the controller 190 may control the focus-picture to be transmitted.

FIGS. 11a to 11g are diagrams illustrating a screen displaying a detected gesture.

In reference to FIGS. 11a to 11g, a gesture 1101 is a space gesture positioning a focus at an area of a first service out of services displayed by the display 150. A gesture 1102 is a space gesture positioning a focus at an area of a second service out of the services displayed by the display 150. A gesture 1103 is a space gesture positioning a focus at an area of a third service out of the services displayed by the display 150.

When the gesture 1101 is detected in case the display 150 displays a screen 300, a focus may be located at the memo service area 320. When the gesture 1102 is detected, a focus may be located at the schedule service area 330. When the gesture 1103 is detected, a focus may be located at the business card area 340.

A gesture 1104 and a gesture 1105 are continuous gestures. In other words, when the gesture 1105 is detected after the gesture 1104, the gestures 1104, 1105 may be recognized as single space gesture. When the gesture 1104 and the gesture 1105 are recognized as continuous gestures in a state of the business card service area 340 being focused, the controller 190 may change the focus-business card image 342. Also, when the gesture 1104 and the gesture 1105 are recognized as continuous gestures in a state of the picture service area 740 being focused, the controller 190 may change the focus-image 742.

When the gesture 1104 and the gesture 1105 are recognized as continuous gestures in a state of the schedule service area 330 being focused, the controller 190 may control the focused date to be changed. When the gesture 1104 and the gesture 1105 are recognized as continuous gestures in a state of the map service area 730 being focused, the controller 190 may control a displayed map zone 734 to be moved.

A gesture 1106 is a space gesture configured to display a window related to the focused service area. When the gesture 1106 is detected in a state of the memo service area 320 being focused, the memo window 400 may be displayed. When the gesture 1106 is detected in a state of the schedule service area 330 being focused, the schedule window 500 may be displayed. When the gesture 1106 is detected in a state of the business card service area 340 being focused, the business card image 600 may be displayed. Also, when the gesture 1106 is detected in a state of the file search service area 720 being focused, the file transmission list 800 may be displayed. When the gesture 1106 is detected in a state of the map service area 730 being focused, the map 900 may be displayed. When the gesture 1106 is detected in a state of the picture service area 740 being displayed, the picture 1000 may be displayed.

A gesture 1107 is a space gesture requesting transmission of information or contents displayed in the service area. When the gesture 1107 is detected in a state of the memo service area 320 being focused, a memo inputted on the memo service area 320 may be transmitted. When the gesture 1107 is detected in a state of the memo window 400 being displayed, a memo inputted on the memo window 400 may be transmitted. When the gesture 1107 is detected in a state of the schedule window 500 being displayed, schedule information displayed by the schedule window 500 may be transmitted.

When the gesture 1107 is detected in a state of the business card service area 340 being focused, a focus-business card image may be transmitted. When the gesture 1107 is detected in a state of the business card image 600 being displayed, the business card image 600 may be transmitted.

Figure 12:
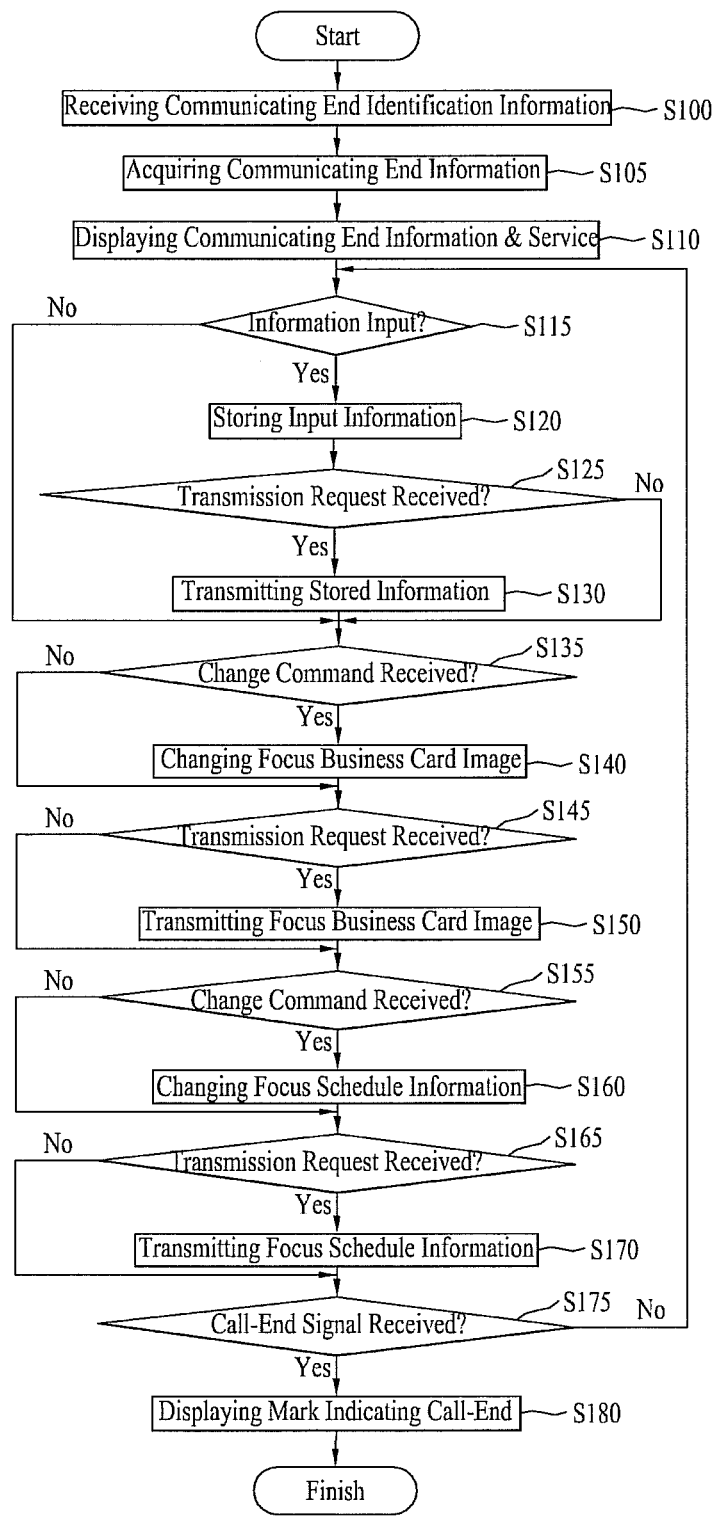
FIG. 12 is a flowchart illustrating a process of a method for transmitting data according to an exemplary embodiment of the present invention.

FIG. 12 is a flowchart illustrating a process of a method for transmitting data according to an exemplary embodiment of the present invention.

In reference to FIG. 12, the network interface 130 receives communicating end identification information from the mobile communication terminal 10 (S100). Here, the communicating end identification information may be identification information to identify a mobile communication terminal requesting call-connection with the mobile communication terminal 10 or it may be identification information to identify a mobile communication terminal call-connected with the mobile communication terminal 10. Also, the communicating end identification information may be identification information to identify a mobile communication terminal with which the mobile communication terminal 10 requests call-connection.

The controller 190 acquires communicating end information (S105). Here, the communicating end information may include at least one of a name, relation information, affiliated organization name, job position name, picture, telephone number, email address and messenger address.

The controller 190 may acquire the communicating end information based on the identification information received from the mobile communication terminal 10.

If the acquiring of the communicating end information is failed, a graphic user interface configured to receive input of information for searching the communicating end information may be controlled to be displayed. Here, the information may be one of the telephone number and the name. The graphic user interface may be displayed automatically or according to the user's request action.

The graphic user interface may be an input window to receive input of the information. Alternatively, the graphic user interface may display a list of items to select the information and the user may select a specific item displayed on the list to input the information.

The controller 190 may acquire the communicating end information based on the information inputted via the graphic user interface.

The display 150 displays the communicating end information acquired by the controller 190 and the service area (S110). Here, the display 150 may display the screen 300.

In the step of S110, the controller 190 may configure at least one service area which will be displayed based on at least one of the identification information and the communicating end information. Here, at least one service area which will be displayed may be selected based on relation information included in the communicating end information.

Hence, the controller 190 may control the display 150 to display at least one configured service area. Because of that, a different service area for each communicating end may be displayed and the electronic device according to the present invention may provide the user with a necessary service which is proper to the communicating end on a call.

The controller 190 identifies whether information is inputted at the memo service area (S115).

When the information is inputted at the memo service area, the controller 190 may control the input information to be stored (S120).

The controller 190 identifies whether to receive transmission request of the information displayed on the memo service area (S125). Here, the transmission request may be inputted by a touch gesture or a space gesture.

When the transmission request is received, the network interface 130 transmits the information displayed on the memo service area (S130).

The controller 190 identifies whether a change command is received on the business card service area (S135). Here, the change command may be inputted by a touch gesture or a space gesture.

When the change command is received, the controller 190 changes a focus business card image (S140).

The controller 190 identifies whether transmission request of the business card image displayed on the business card service area is received (S145).

When the transmission request is received, the controller 190 transmits the focus business card image (S150).

The controller 190 identifies whether a change command is received on the schedule service area (S155).

When the change command is received, the controller 190 changes the focus schedule information on the schedule service area (S160).

The controller identifies whether transmission request of the schedule information displayed on the schedule service area is received (S165).

When the transmission request is received, the controller 190 transmits focus schedule information (S170).

The controller 190 identifies whether a call-end signal is received from the mobile communication terminal 10 (S175).

When the call-end signal is received, the display 150 displays a mark indicating the call-end (S180).

Figure 13:
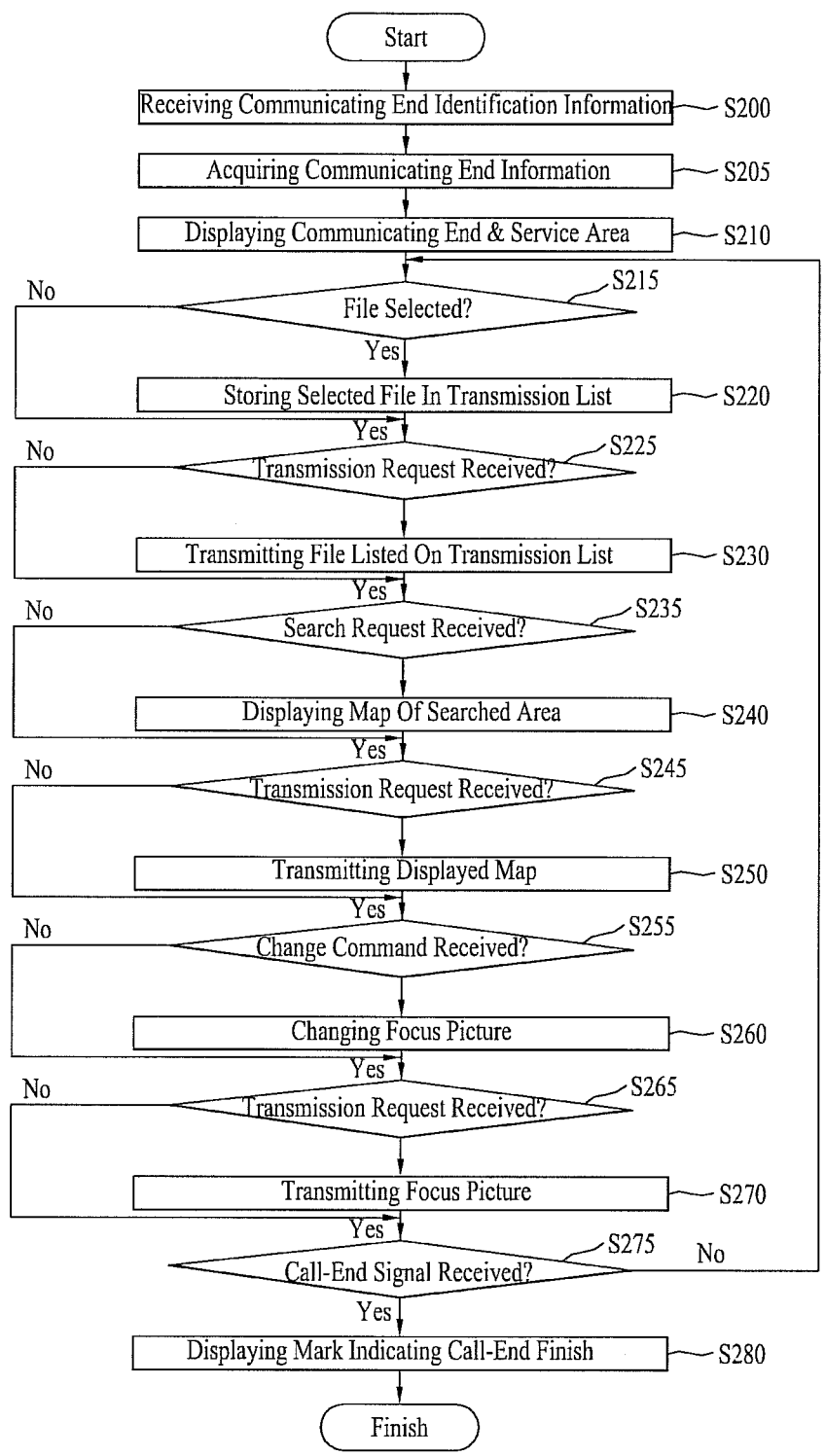
FIG. 13 is a flowchart illustrating a process of a method for transmitting data according to another exemplary embodiment of the present invention.

FIG. 13 is a flowchart illustrating a process of a method for transmitting data according to another embodiment of the present invention.

In reference to FIG. 13, the network interface 130 receives communicating end identification information from the mobile communication terminal 10 (S200). Here, the communicating end identification information may be identification information to identify a mobile communication terminal to identify a mobile communication terminal requesting call-connection with the mobile communication terminal 10 or it may be identification information to identify a mobile communication terminal call-connected with the mobile communication terminal 10. Also, the communicating end identification information may be identification information to identify a mobile communication terminal with which the mobile communication terminal 10 requests call-connection.

The controller 190 acquires communicating end information based on the identification information received from the mobile communication terminal 10 (S205). Here, the communicating end information may include at least one of the name, the relation information, the affiliated organization name, the job position name, the picture, the telephone number, email address or the messenger address.

The display 150 displays the communicating end information acquired by the controller 190 and a service area (S210). Here, the display 150 may display a screen 700.

The controller 190 identifies whether a file is selected from information of the file search service area (S215).

When the file is selected, the controller 190 stores the selected file in the file transmission list (S220).

The controller 190 identifies whether file transmission request is received (S225). Here, the file transmission request may be inputted by a touch gesture or a space gesture. For example, when a gesture 1107 is detected in a state of the file search service area being focused, the controller 190 identifies that the file transmission request is received.

When the file transmission request is received, the network interface 130 transmits information on files listed on the file transmission list (S230).

The controller 190 identifies whether search request is received on the map service area (S135). Here, the search request may be inputted by a touch gesture or a space gesture.

When the search request is received, the controller 190 searches a map of the search requested area and it controls the searched map to be displayed on the search service area (S240).

The controller 190 identifies whether transmission request for the map displayed on the map service area is received (S245).

When the transmission request is received, the controller 190 transmits the map displayed on the search service area (S250).

The controller 190 identifies whether a change command is received on the picture service area (S225). Here, the change command may be inputted by a touch gesture or a space gesture.

When the change command is received, the controller 190 changes a focus picture on the picture service area (S260).

The controller 190 identifies whether transmission request for the picture displayed on the picture service area is received (S265).

When the transmission request is received, the controller 190 transmits the focus picture (S270).

The controller 190 identifies whether a call-end signal is received from the mobile communication terminal 10 (S275).

When the call-end signal is received, the display 150 displays a mark indicating the call-end (S280).

The present invention may be embodied as code readable by a computer in a recording medium readable by a computer. The recording medium includes all kinds of recording devices capable of store data readable by a computer device. For example, the recording medium readable by the computer may be a ROM, RAM, CD-ROM, magnetic tape, floppy disk, optical data storing device, and it may be embodied as a carrier wave type (for example, transmission via internet). The recording medium readable by the computer may be distributed in a computer unit connected via a network and a code readable by the computer in distribution may be stored in the recording medium to be implemented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, the present invention is directed to an electronic device and a method for transmitting data.

An object of the present invention is to provide an electronic device capable of allowing a user to search for information or contents to transmit to a counterpart talker on the other end during a call easily and conveniently, and a method for transmitting data using the electronic device.

Another object of the present invention is to provide a computer readable medium recording a program configured to implement the method for transmitting the data.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data includes steps of: receiving identification information to identify a communicating end from a mobile communication terminal; acquiring communicating end information based on the received identification information; displaying the acquired communicating end information and at least one service area; receiving transmission request for information or a content displayed on the displayed at-least-one service area; and transmitting the information or the content to an electronic device having an address indicated by the communicating end information. The identification information may be one of a telephone number of the communicating end and an identifier related to the telephone number. The identification information may be transmitted at a predetermined point of one of call-connection request receiving, call-connection requesting, call-setting and a user's request. The identification information may be transmitted in one of Zigbee, Bluetooth, UWB and Wireless Lan communication types.

The method for transmitting the data may further include steps of: displaying a graphic user interface to receive input of information to search for the communicating end information, when the acquiring of the communicating end information is failed; and acquiring the communicating end information based on the input information.

The step of displaying the at least one service area may include a step of configurating the at least one service area based on at least one of the identification information or the communicating end information.

The communicating end information may include at least one of a name, relation information, affiliated organization name, job position name, picture, telephone number, email address or messenger address. The communicating end information may be information stored in a local memory or information received via network communication.

The transmission request may be requested by a touch gesture or space gesture.

One of the at least one service area may be one of a business card service area configured to display a business card image, a memo service area configured to receive input of a memo, a schedule service area configured to display a schedule window, a map service area configured to display a map, a picture service area configured to display a picture and a file search service area to display a file list. The business card service area may include a plurality of business card images and the business card service area displays one of the business card images as focus business card image, and the focus business card image may be changed according to a recognized gesture. The schedule service area may display an interface capable of identifying schedule information by the date or hour, and the transmitting step includes transmitting the schedule information. The memo service area may include an input box configured to receive input of information, and the transmitting step includes transmitting the information inputted in the input box.

In another aspect of the present invention, an electronic device includes a network interface configured to receive identification information to identify a communicating end from a mobile communication terminal; a controller configured to acquire communicating end information based on the received identification information; and a display configured to display the acquired communicating end information and at least one service area; wherein the controller detects transmission request for information or a content displayed on the displayed at-least-one service area and controls the information or the content to be transmitted to an electronic device having an address indicated by the communicating end information.

The controller may display a graphic user interface to receive input of information to search for the communicating end information, when the acquiring of the communicating end information is failed, and it may acquire the communicating end information based on the input information.

The controller may configure the at least one service area based on at least one of the identification information or the communicating end information.

The identification information may be one of a telephone number of the communicating end and an identifier related to the telephone number. The identification information may be transmitted at a predetermined point of one of call-connection request receiving, call-connection requesting, call-setting and a user's request. The identification information may be transmitted in one of Zigbee, Bluetooth, UWB and Wireless Lan communication types.

The communicating end information may include at least one of a name, relation information, affiliated organization name, job position name, picture, telephone number, email address or messenger address. The communicating end information may be information stored in a local memory or information received via network communication.

The transmission request may be requested by a touch gesture or space gesture.

One of the at least one service area may be one of a business card service area configured to display a business card image, a memo service area configured to receive input of a memo, a schedule service area configured to display a schedule window, a map service area configured to display a map, a picture service area configured to display a picture and a file search service area to display a file list. The business card service area may include a plurality of business card images and the business card service area displays one of the business card images as focus business card image, and the focus business card image is changed according to a recognized gesture. The schedule service area may display an interface capable of identifying schedule information by the date or hour. The memo service area may include an input box configured to receive input of information.

According to the electronic device and the method for transmitting data of the present invention, the communicating end information is automatically acquired and the service area for the user to search for information or contents conveniently is displayed. Also, the information or contents displayed on the service area is transmitted to the communicating end by using the communicating end information. As a result, the user may search for information or contents during the call conveniently and he or she may transmit the searched information or contents to the communicating end on the other end, without additional information inputting.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for transmitting data comprising:
receiving, from a mobile communication terminal, identification information to identify a communicating end terminal;
obtaining communicating end information based on the received identification information;
displaying at least one service area and the obtained communicating end information on a screen, wherein the at least one service area is displayed on the screen when a call signal is received from the mobile communication terminal, and wherein the at least one service area is one of a business card service area to display a business card image, a memo service area to receive input of a memo, a schedule service area to display a schedule window, a map service area to display a map, a picture service area to display a picture or a file search service area to display a file list;
receiving a transmission request for information or content displayed at the at least one service area of the screen; and
transmitting the information or the content to an electronic device.

2. The method of claim 1, wherein receiving the transmission request includes receiving a user gesture at the at least one service area of the screen.

3. The method of claim 1, wherein obtaining communicating end information includes transmitting a search request signal, and receiving the communicating end information from a server as a result of the transmitted search request signal.

4. The method of claim 1, wherein obtaining the communicating end information includes obtaining the communication end information from an external device.

5. The method of claim 4, wherein the external device is a DVD player, a Bluray player, a game device, a camera device or a computer.

6. The method of claim 1, wherein the identification information is a telephone number of the communicating end terminal or is an identifier related to the telephone number of the communicating end terminal.

7. The method of claim 1, wherein the identification information is transmitted at a point in which the mobile communication terminal receives a call-connection request from the communicating end terminal, the mobile communication terminal requests a call-connection with the communicating end terminal, a call-setting or a user's request.

8. The method of claim 1, wherein the communicating end information is a name, relation information, an organization name, a job position name, a picture, a telephone number, an email address or a messenger address.

9. The method of claim 1, wherein transmitting the information or the content includes transmitting the information or the content to an electronic device having an address that corresponds to the communicating end information.

10. An electronic device comprising:
a network interface to receive, from a mobile communication terminal, identification information to identify a communicating end terminal;
a controller to obtain communicating end information based on the received identification information; and
a display to display at least one service area and the obtained communicating end information on a screen, wherein the at least one service area is displayed on the screen when a call signal is received from the mobile communication terminal, and wherein the at least one service area is one of a business card service area to display a business card image, a memo service area to receive input of a memo, a schedule service area to display a schedule window, a map service area to display a map, a picture service area to display a picture or a file search service area to display a file list.

11. The electronic device of claim 10, wherein the controller receives the transmission request by the display receiving a user gesture at the at least one service area of the screen.

12. The electronic device of claim 10, wherein the controller obtains the communicating end information by transmitting a search request signal, and receiving the communicating end information from a server as a result of transmitting the search request signal.

13. The electronic device of claim 10, wherein the identification information is a telephone number of the communicating end terminal or is an identifier related to the telephone number of the communicating end terminal.

14. The electronic device of claim 10, wherein the communicating end information is a name, relation information, an affiliated organization name, a job position name, a picture, a telephone number, an email address or a messenger address.

15. The electronic device of claim 10, wherein the controller controls transmission of the information or the content to an electronic device having an address that corresponds to the communicating end information.

16. A method for transmitting data comprising:
receiving, from a mobile communication terminal, identification information to identify a communicating device, wherein the identification information relates to a telephone number of the communicating device;
obtaining communicating information based on the received identification information;
displaying the obtained communicating information on a service area of a screen, wherein the service area is displayed on the screen when a call signal is received from the mobile communication terminal, and wherein the at least one service area is one of a business card service area to display a business card image, a memo service area to receive input of a memo, a schedule service area to display a schedule window, a map service area to display a map, a picture service area to display a picture or a file search service area to display a file list;
receiving a user gesture input at the service area of the screen while the communicating info nation is displayed on the service area of the screen; and
transmitting the communicating information to an electronic device in response to the received user gesture input.

17. The method of claim 16, wherein obtaining the communication information includes transmitting a search request signal, and receiving the communicating information from a server as a result of transmitting the search request signal.

18. The method of claim 16, wherein obtaining the communicating information includes obtaining the communication information from an external device.

19. The method of claim 16, wherein transmitting the info nation to an electronic device includes transmitting the information to an electronic device having an address that corresponds to the communicating information.

20. The method of claim 16, wherein the communicating information is one of a name, relation information, an organization name, a job position name, a picture, a telephone number, an email address or a messenger address.

* * * * *